United States Patent
Carsello

(10) Patent No.: US 11,648,483 B2
(45) Date of Patent: May 16, 2023

(54) SOFT-BODY TOYS WITH AIR-ACTUATED SOUND GENERATORS

(71) Applicant: Funko, LLC, Everett, WA (US)

(72) Inventor: Thomas M. Carsello, Seattle, WA (US)

(73) Assignee: Funko, LLC, Everett, WA (US)

(*) Notice: Subject to any disclaimer, the term of this patent is extended or adjusted under 35 U.S.C. 154(b) by 130 days.

(21) Appl. No.: 17/139,497

(22) Filed: Dec. 31, 2020

(65) Prior Publication Data

US 2021/0205721 A1 Jul. 8, 2021

Related U.S. Application Data

(60) Provisional application No. 62/976,844, filed on Feb. 14, 2020, provisional application No. 62/957,085, filed on Jan. 3, 2020.

(51) Int. Cl.
| | |
|---|---|
| *A63H 5/00* | (2006.01) |
| *H04R 1/02* | (2006.01) |
| *H04R 3/00* | (2006.01) |
| *G06F 3/16* | (2006.01) |
| *A63H 33/22* | (2006.01) |
| *G01L 7/08* | (2006.01) |

(Continued)

(52) U.S. Cl.
CPC ............... *A63H 5/00* (2013.01); *A63H 33/22* (2013.01); *G01L 7/08* (2013.01); *G06F 3/165* (2013.01); *H04R 1/028* (2013.01); *H04R 3/00* (2013.01); *A63H 3/006* (2013.01); *A63H 3/28* (2013.01); *A63H 17/268* (2013.01); *A63H 17/28* (2013.01); *A63H 2200/00* (2013.01)

(58) Field of Classification Search
CPC .................................. A63H 3/28; A63H 5/00
See application file for complete search history.

(56) References Cited

U.S. PATENT DOCUMENTS

| | | | |
|---|---|---|---|
| 5,816,885 A | 10/1998 | Goldman et al. | |
| 5,820,440 A * | 10/1998 | Truchsess | A63H 3/28 446/305 |

(Continued)

FOREIGN PATENT DOCUMENTS

KR 2019920003919 6/1992

OTHER PUBLICATIONS

ISA, PCT Application No. PCT/US2020/067688, International Search Report and Written Opinion dated Apr. 15, 2021, 11 pages.

*Primary Examiner* — John A Ricci
(74) *Attorney, Agent, or Firm* — Perkins Coie LLP

(57) ABSTRACT

Sound-generating toys are disclosed herein. In some embodiments, a sound-generating toy includes a squeezable body defining an internal chamber. A sound-generating module is positioned within the chamber. The module can include a housing containing (i) an airflow sensor configured to detect a pressure change in the chamber, (ii) a speaker configured to generate an audio output, and (iii) programmable circuitry operably coupled to the airflow sensor and the speaker. In operation, the airflow sensor can detect a pressure change in the chamber caused by a user squeezing the body of the toy, and can output a signal to the programmable circuitry indicating the pressure change. After receiving the signal indicating the pressure change, the programmable circuitry can drive the speaker to generate the audio output.

17 Claims, 5 Drawing Sheets

(51) Int. Cl.
    *A63H 3/28*     (2006.01)
    *A63H 17/26*     (2006.01)
    *A63H 17/28*     (2006.01)
    *A63H 3/00*     (2006.01)

(56) References Cited

U.S. PATENT DOCUMENTS

| | | | |
|---|---|---|---|
| 8,808,052 B2 * | 8/2014 | Yang | A63H 3/28 446/175 |
| 2004/0180603 A1 | 9/2004 | Barri et al. | |
| 2014/0256213 A1 * | 9/2014 | Copeland | A63H 3/28 446/268 |
| 2016/0055755 A1 | 2/2016 | Hawkins | |
| 2016/0236107 A1 | 8/2016 | Irie | |
| 2019/0176046 A1 * | 6/2019 | Sutton | H03K 17/9625 |

* cited by examiner

SOFT-BODY TOYS WITH AIR-ACTUATED SOUND GENERATORS

CROSS-REFERENCE TO RELATED APPLICATIONS

This application claims the benefit of (i) U.S. Provisional Patent Application No. 62/957,085, filed Jan. 3, 2020, and titled "SOFT-BODY TOYS WITH AIR-ACTUATED SOUND GENERATORS," and (ii) U.S. Provisional Patent Application No. 62/976,844, filed Feb. 14, 2020, and titled "SOFT-BODY TOYS WITH AIR-ACTUATED SOUND GENERATORS," each of which is incorporated herein by reference in its entirety.

TECHNICAL FIELD

The present technology is related to sound-generating toys and, more particularly, to soft-body toys including sound-generating modules that can be triggered to produce a selected audio output when a user squeezes the toy.

BACKGROUND

Toys are popular with both children and adults. Some toys can be actuated by a user to generate sounds. For example, some dolls can be actuated to produce spoken words, some toys resembling animals can be actuated to generate animal noises, some toys resembling automobiles can be actuated to generate engine noises, etc. To actuate such toys, the user typically must find and press a button, switch, or other actuatable component positioned inside the toy. However, it can often be difficult for the user (e.g., a small child) to locate the actuatable component within the toy. Moreover, such actuatable components are susceptible to failure after repeated mechanical actuation, shortening the functional lifetime of the toy.

BRIEF DESCRIPTION OF THE DRAWINGS

Many aspects of the present technology can be better understood with reference to the following drawings. The components in the drawings are not necessarily to scale. Instead, emphasis is placed on clearly illustrating the principles of the present technology.

DETAILED DESCRIPTION

The present technology is directed generally to sound-generating toys that include air-actuated sound-generating modules. In some embodiments, for example, a sound-generating toy can include a soft body defining a chamber and a sound-generating module positioned within the chamber. The module can include an airflow sensor, a power source, programmable circuitry, and a speaker operably coupled together to form a sound-generating circuit. The airflow sensor is configured to (i) detect a pressure change in the chamber caused by a user squeezing the soft body of the toy, and (ii) output a signal to the programmable circuitry indicating that the toy has been squeezed. After receiving the signal from the airflow sensor, the programmable circuitry is configured to drive the speaker to generate a preselected audio output.

Specific details of several embodiments of the present technology are described herein with reference to FIGS. 1A-4. The present technology, however, may be practiced without some of these specific details. In some instances, well-known structures and techniques often associated with airflow sensors, printed circuit boards, processing circuitry and memory, speakers, soft-body toys, and the like have not been shown in detail so as not to obscure the present technology. The terminology used in the description presented below is intended to be interpreted in its broadest reasonable manner, even though it is being used in conjunction with a detailed description of certain specific embodiments of the disclosure. Certain terms may even be emphasized below; however, any terminology intended to be interpreted in any restricted manner will be overtly and specifically defined as such in this Detailed Description section.

The accompanying Figures depict embodiments of the present technology and are not intended to be limiting of its scope. The sizes of various depicted elements are not necessarily drawn to scale, and these various elements may be arbitrarily enlarged to improve legibility. Component details may be abstracted in the Figures to exclude details such as position of components and certain precise connections between such components when such details are unnecessary for a complete understanding of how to make and use the present technology. Many of the details, dimensions, angles, and other features shown in the Figures are merely illustrative of particular embodiments of the disclosure. Accordingly, other embodiments can have other details, dimensions, angles, and features without departing from the spirit or scope of the present technology.

Figure 1A:
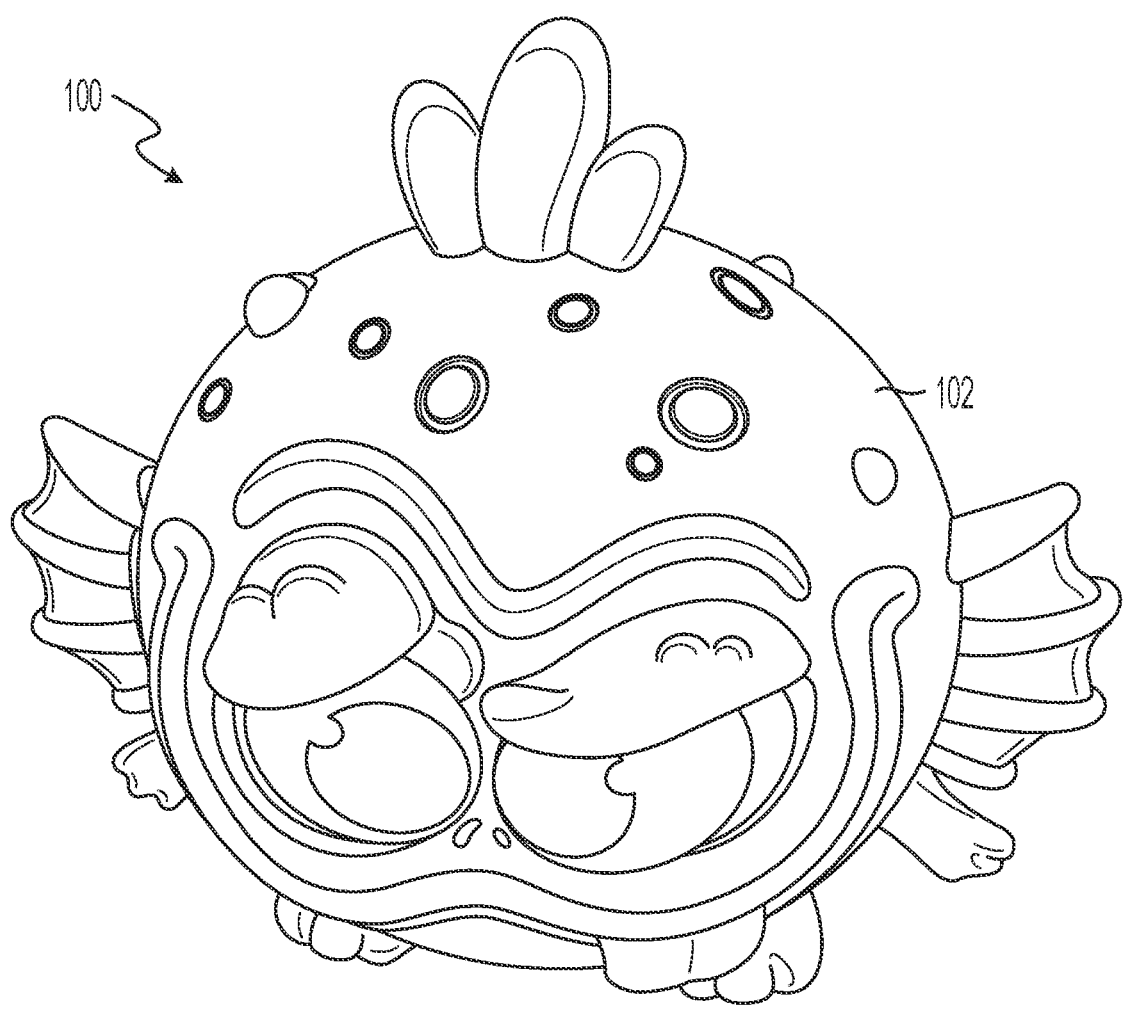
FIGS. 1A and 1B are a front perspective view and a partially-schematic view, respectively, of a sound-generating toy configured in accordance with embodiments of the present technology.
Figure 1B:
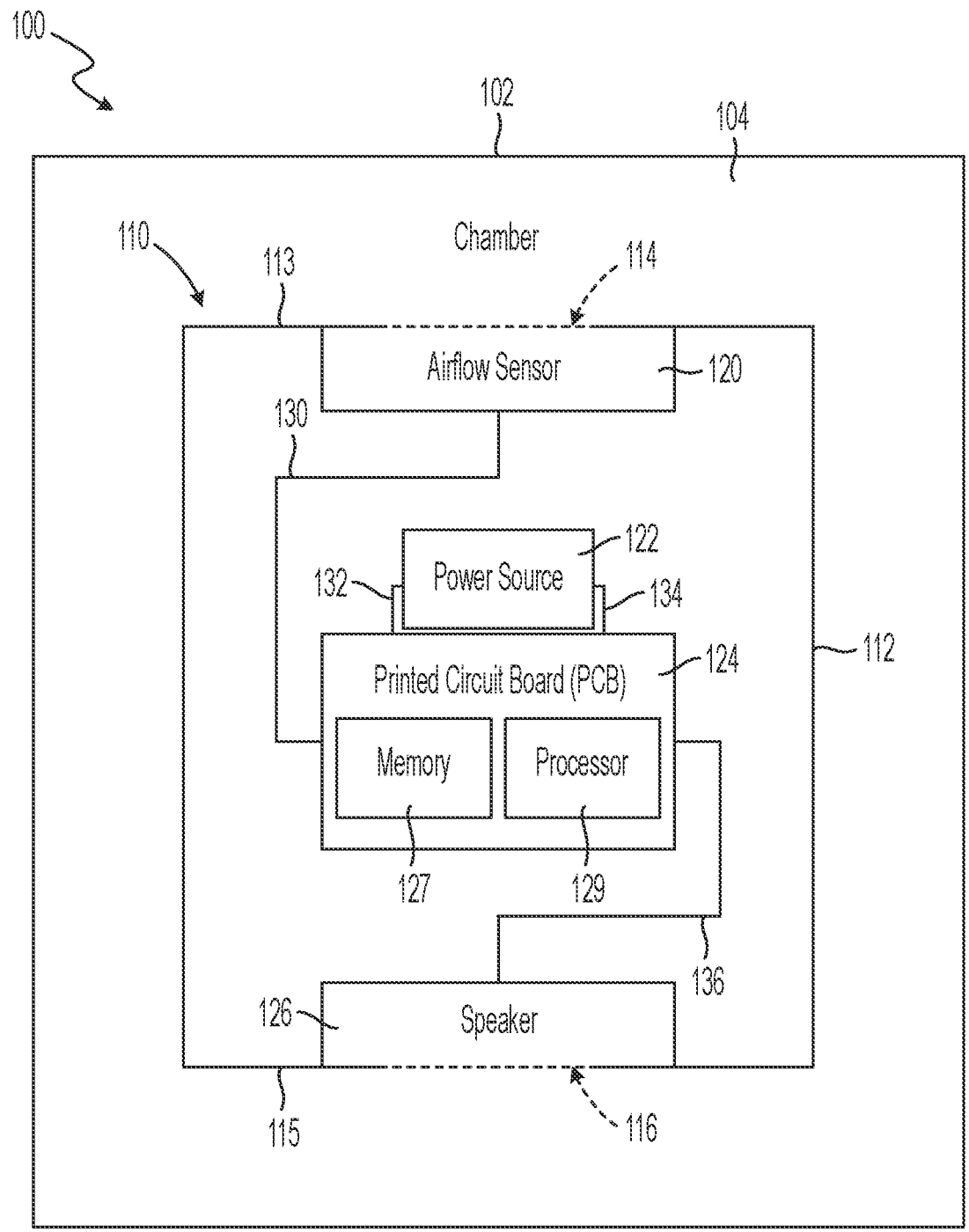

FIGS. 1A and 1B are a front perspective view and a partially-schematic view of a sound-generating toy 100, respectively, configured in accordance with an embodiment of the present technology. Referring to FIG. 1A, the sound-generating toy 100 includes a body 102 that can be shaped, colored, textured, and so on to resemble a character, animal, person, automobile, or other selected toy design. In the illustrated embodiment, for example, the body 102 of the toy 100 is shaped as a "monster-like" character. However, the body 102 of the toy 100 can have any selected shape/configuration. Referring to FIG. 1B, the body 102 can define an internal chamber 104. In other embodiments, the body 102 can enclose a separate bladder, bag, pouch, and/or other container within the body 102 that defines the internal chamber 104. In some embodiments, the body 102 is deformable to change the volume of the chamber 104. For example, the body 102 can be composed of rubber, plastic, cloth, fiber, textile, and/or another suitable material that can be squeezed by a user to decrease the volume of the chamber 104. In some embodiments, the toy 100 can include stuffing and/or another fill material within the chamber 104 (not shown).

Squeezing (e.g., compressing) the body 102 decreases the volume of the chamber 104 and thereby changes (e.g., increases) the pressure within the chamber 104. In some embodiments, the chamber 104 can be sealed. In other embodiments, the chamber 104 can be at least partially exposed to the environment outside the body 102 such that squeezing the body 102 expels air from inside the chamber 104 through the body 102 to the outside environment (e.g., through an opening in the body 102; not shown). In some embodiments, the body 102 is configured to return to a static (e.g., normal) configuration after being squeezed or otherwise deformed. For example, the body 102 can be formed of an elastic material and configured (e.g., shaped, sized) to return to the static configuration after being squeezed by a user. Additionally or alternatively, the air pressure within the chamber 104 can act to return the body 102 to the static configuration after a user releases the body 102.

The toy 100 further includes a sound-generating module 110 ("module 110") positioned within the chamber 104. The module 110 includes a housing 112 that at least partially encloses (e.g., holds, contains) an airflow sensor 120, a power source 122, a printed circuit board (PCB) 124, and a speaker 126. The airflow sensor 120, the power source 122, the PCB 124, and the speaker 126 are operably coupled together to form a sound-generating circuit. The housing 112 can be formed of a rigid or flexible material such as plastic or metal, and can have various cross-sectional shapes (e.g., rectangular, circular, triangular, polygonal, irregular). In the illustrated embodiment, the housing 112 includes a first side 113 (e.g., a top) and a second side 115 (e.g., a bottom) opposite the first side 113. A first open portion 114 is formed in the first side 113, and a second open portion 116 is formed in the second side 115. In some embodiments, the first open portion 114 and/or the second open portion 116 can comprise a single opening or a plurality of small openings formed through the housing 112 (e.g., as shown in FIG. 3B). In other embodiments, however, the first open portion 114 and/or the second open portion 116 can be omitted, and/or the housing 112 can include additional open portions.

In some embodiments, the module 110 is not attached to the body 102 and therefore not fixed within the chamber 104 (e.g., floating within the chamber 104). In other embodiments, the module 110 can be coupled to the body 102 to fix the position of the module 110 within the chamber 104. For example, the housing 112 of the module 110 can be adhered to, secured via one or more fastening members (e.g., screws, mating connectors), or otherwise attached to the inner surface of the body 102. Likewise, the module 110 can be generally fixed within the module 110 via insertion into a sleeve connected to the body 102 (not shown), or by being positioned in stuffing or another fill material within the chamber 104 (not shown). In some embodiments, the toy 100 is configured such that the module 110 is removable from within the chamber 104. For example, the body 102 can include an opening (not shown) that permits the module 110 to be removed from and inserted into the chamber 104 for repair, replacement of the power source 122 or other components, charging of the power source 122, and the like.

In the illustrated embodiment, the airflow sensor 120 is positioned near (e.g., adjacent to) the first open portion 114 of the housing 112. The airflow sensor 120 is configured to detect/sense that the toy 100 has been squeezed by a user by detecting a change in air pressure within the chamber 104. For example, the airflow sensor 120 can include a flexible diaphragm that moves (e.g., vibrates, flexes) in response to a pressure change, such as in response to a transient sound wave received through the first open portion 114 of the housing 112. The airflow sensor 120 can further include circuitry that converts the movement of the diaphragm into an electrical signal that can be transmitted to the PCB 124 over a first electrical path 130 (e.g., one or more conductive wires). Accordingly, the airflow sensor 120 can act as an air-actuated switch that passes an electrical signal to the PCB 124 (or ceases to pass an electrical signal to the PCB 124) after detecting a change in air pressure within the chamber 104 that indicates that the user has squeezed the toy 100. In some particular embodiments, the airflow sensor 120 can be of the type sold by Hangzhou Toll Microelectronic Co., Ltd, of Hangzhou, China, under the product model "S087A-L50." In some embodiments, the materials used to form the various components of the toy 100 can be selected such that the airflow sensor 120 is triggered at a selected air pressure and/or such that a selected actuation pressure needs to be applied to the toy 100 to trigger the airflow sensor 120.

In the illustrated embodiment, the power source 122 is electrically coupled to the PCB 124 via a first conductive contact 132 and a second conductive contact 134. In some embodiments, the power source 122 can be physically mounted on the PCB 124. In some embodiments, the power source 122 comprises one or more batteries and, accordingly, the first conductive contact 132 can be a negative contact and the second conductive contact 134 can be a positive contact. In a particular embodiment, the power source 122 comprises a plurality of button cell batteries (e.g., three batteries) electrically coupled together (e.g., in series). In some embodiments, the power source 122 can be operably coupled to the airflow sensor 120 indirectly via the PCB 124, or directly via another electrical path (not shown), to power the airflow sensor 120. For example, the power source 122 can provide a supply voltage to the airflow sensor 120 during operation.

The PCB 124 can include programmable circuitry configured to (i) receive signals from the airflow sensor 120 and (ii) drive the speaker 126 to produce an audio output, such a sound audible to a human user. In some embodiments, the programmable circuitry includes a memory 127 storing instructions, and a processor 129 operably coupled to the memory 127 and configured to execute the instructions. In some embodiments, the memory 127 is a one-time programmable memory that can be programmed to store instructions for outputting certain audio outputs via the speaker 126. Accordingly, the instructions can include information about a duration, amplitude, frequency, and/or other characteristics of a selected (e.g., preprogramed) audio output. In general, however, the memory 127 may include, but is not limited to, optical disks, compact disc read-only memories (CD-ROMs), magneto-optical disks, read-only memories (ROMs), random access memories (RAMs), erasable programmable read-only memories (EPROMs), electrically erasable programmable read-only memories (EEPROMs), magnetic or optical cards, flash memory, and/or other types of media/machine-readable mediums suitable for storing electronic instructions. The processor 129 can be a microprocessor, microcontroller, and/or another electronic device including (i) special-purpose hardware (e.g., circuitry), (ii) programmable circuitry appropriately programmed with software and/or firmware, or (iii) a combination of special-purpose and programmable circuitry.

In the illustrated embodiment, the speaker 126 is positioned near (e.g., adjacent to) the second open portion 116 of the housing 112 and is operably coupled to the PCB 124 via a second electrical path 136 (e.g., one or more conductive wires). The speaker 126 is configured to receive electrical signals (e.g., drive signals) over the second electrical path 136 and generate an audio output based on the electrical signals. The audio output can be, for example, human speech, animal sounds, sounds of human bodily functions, automobile sounds, and/or any other type of audio output selected for the particular embodiment of the toy 100.

In operation, a user need only squeeze the body 102 of the toy 100 to cause the toy 100 to produce an audio output. The airflow sensor 120 then detects the pressure change caused by the squeeze and outputs a signal to the PCB 124 over the first electrical path 130. The PCB 124 receives the signal and the processor 129 executes the instructions stored in the memory 127 to output electrical signals via the second electrical path 136 to the speaker 126 to drive the speaker 126 to produce the audio output. In some embodiments, the stored instructions can include instructions for producing a plurality of different audio outputs. Accordingly, in some embodiments (i) squeezing the toy 100 a first time will cause the module 110 to output a first audio output (e.g., a word, phrase, sentence), (ii) squeezing the toy 100 a second time will cause the module 110 to output a second audio output different than the first audio output (e.g., a different word, phrase, sentence), (iii) squeezing the toy 100 a third time will cause the module 110 to output a third audio output different than the first and second audio outputs, and so on.

In one aspect of the present technology, a user can easily actuate the module 110 to generate an audio output by squeezing any portion of the body 102 of the toy 100. In contrast, many conventional sound-generating toys require a user to locate and press an actuatable component (e.g., switch, button) within the toy to cause the toy to generate an audio output. However, it can be difficult to locate such actuatable components (e.g., for a small child), and such components are susceptible to mechanical failure after repeated actuation.

Figure 2A:
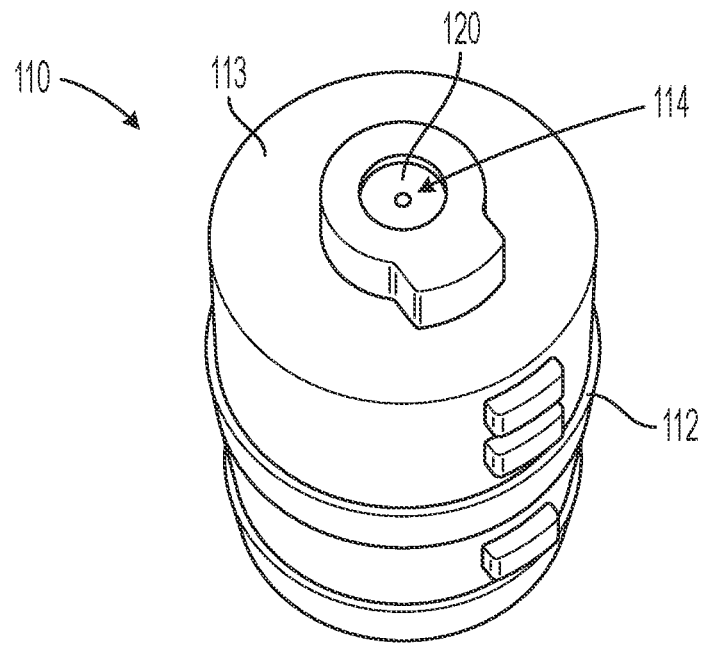
FIGS. 2A and 2B are a top perspective view and a bottom perspective view, respectively, of a sound-generating module of the sound-generating toy of FIGS. 1A and 1B in accordance with embodiments of the present technology.
Figure 2B:
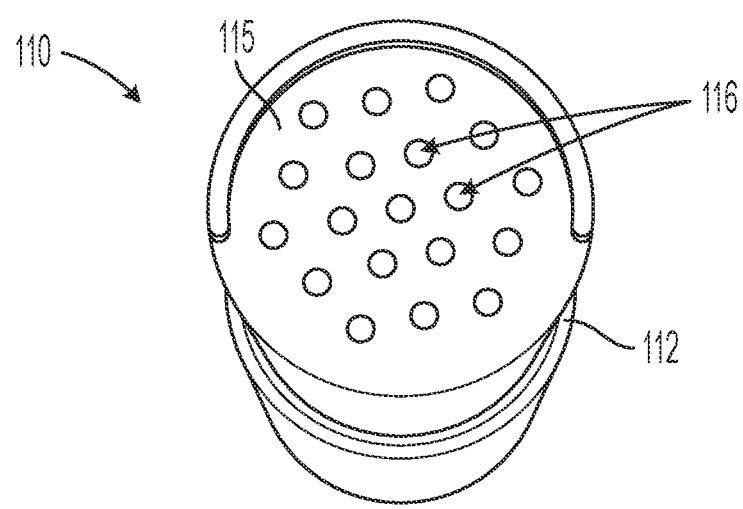

FIGS. 2A and 2B are a top perspective view and a bottom perspective view, respectively, of the sound-generating module 110 configured in accordance with embodiments of the present technology. As shown in FIG. 2A, the airflow sensor 120 is positioned adjacent the first open portion 114 (e.g., aperture) extending through the first side 113 of the housing 112. As shown in FIG. 2B, the second open portion 116 can comprise a plurality of apertures extending through the second side 115 of the housing 112. Referring to FIGS. 2A and 2B together, the housing 112 can have a generally cylindrical shape.

Referring again to FIG. 1B, alternatively or additionally, the airflow sensor 120 can be operably coupled to one or more components (e.g., electronic components) other than the speaker 126. For example, the airflow sensor 120 can be (i) operably coupled directly, via the PCB 124, or in a different manner to one or more lights, motors, switches, mechanical components, and so on, and (ii) configured to drive the one or more components to produce/generate an output after detecting a change in air pressure. As one example, the airflow sensor 120 could be operably coupled to one or more lights attached to and/or visible at the outside of the body 102 of toy 100. Accordingly, squeezing the body 102 can activate the airflow sensor 120 to trigger illumination of the lights. In yet other embodiments, the module 110 can be incorporated into squeezable devices having air bladders other than toys.

Figure 3:
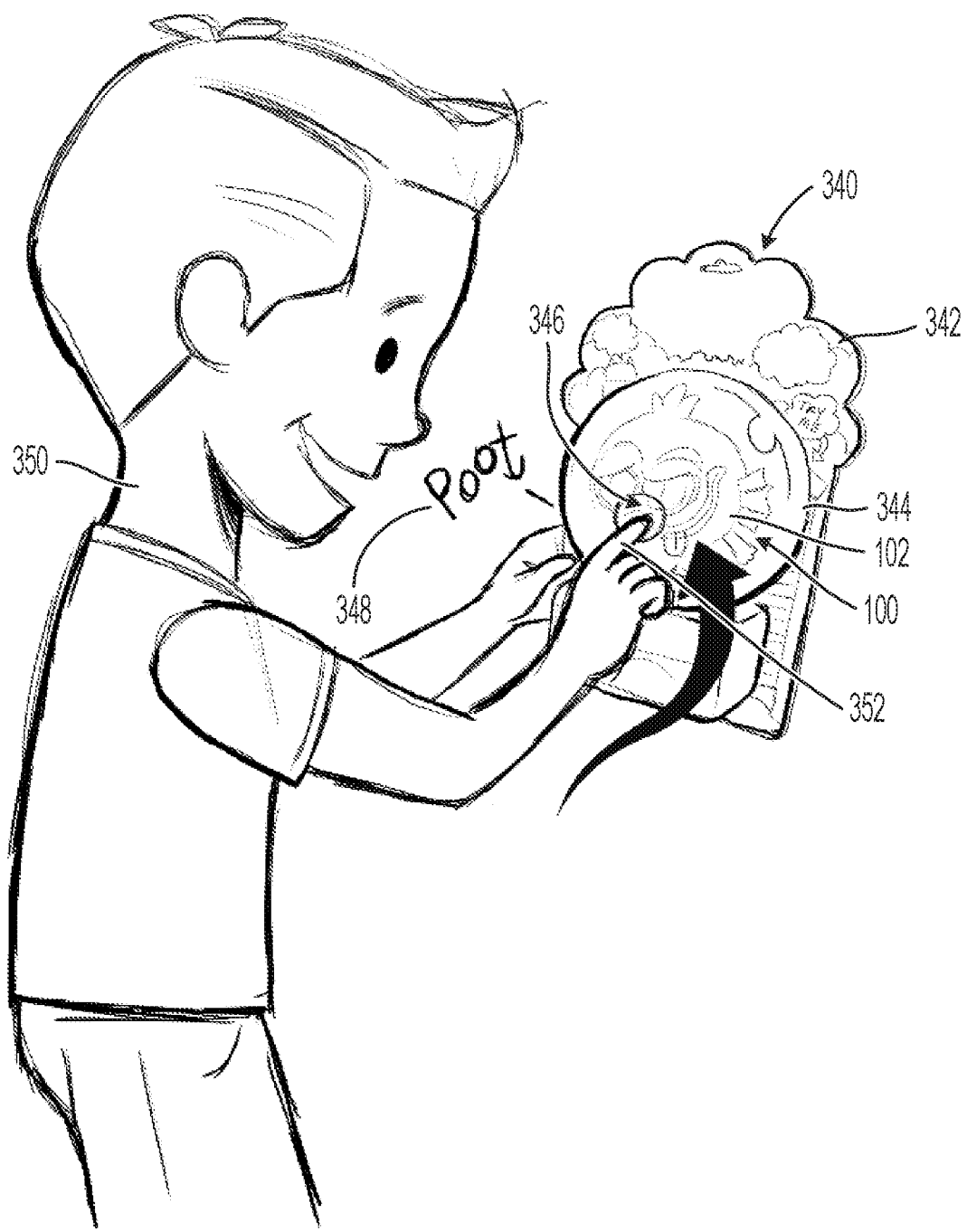
FIG. 3 is a perspective view of a packaging or casing for securely holding the sound-generating toy of FIGS. 1A and 1B in accordance with embodiments of the present technology.

FIG. 3 is a perspective view of a packaging or casing 340 for securely holding the toy 100 of FIGS. 1A and 1B in accordance with embodiments of the present technology. The casing 340 can be used to transport, store, and/or display the toy 100, such as in a store or other location. In the illustrated embodiment, the casing 340 includes a first portion 342 and a second portion 344 coupled to the first portion 342 and configured to be positioned around/over the toy 100 (e.g., to receive the toy 100). In some embodiments, the first portion 342 can comprise cardboard, paper, plastic, and/or combinations of such materials. The second portion 344 can comprise plastic, paper, or other suitable materials and, in some embodiments, can be clear or semi-clear to allow a user 350 to at least generally view the toy 100 (e.g., to visualize the body 102 of the toy 100) when the toy 100 is secured within the casing 340.

In the illustrated embodiment, the second portion 344 of the casing 340 further includes an opening/aperture 346 configured (e.g., sized, shaped, and/or positioned) to allow the user 350 to insert one or more of their fingers 352 therethrough to depress the body 102 of the toy 100. Referring to FIGS. 1A-3 together, when the user 350 depresses the body 102 of the toy 100, the change in air pressure can trigger the module 110 to generate an audio output 348. Accordingly, in one aspect of the present technology the casing 340 is configured to allow the user 350 to actuate the module 110 to hear the audio output while the toy 100 is still packaged within the casing 340 such as, for example, when the toy 100 is for sale within a store.

Figure 4:
FIG. 4 is a perspective view of a packaging or casing for securely holding the sound-generating toy of FIGS. 1A and 1B in accordance with additional embodiments of the present technology.

FIG. 4 is a perspective view of a packaging or casing 440 for securely holding the toy 100 of FIGS. 1A and 1B in accordance with additional embodiments of the present technology. In some embodiments, the casing 440 can include features generally similar or identical to the casing 340 described in detail with reference to FIG. 3. For example, the casing 440 can be used to transport, store, and/or display the toy 100, such as in a store or other location. Similarly, the casing 440 can include a first portion 442 (e.g., a cardboard, plastic, and/or paper backing) and a second portion 444 (e.g., a clear plastic receiving portion) coupled to the first portion 442 and configured to be positioned around/over the toy 100.

In the illustrated embodiment, the casing 440 further includes a third portion 447 coupled to the first portion 442 and/or the second portion 444. The third portion 447 can comprise cardboard, paper, plastic, and/or combinations of such materials, and is configured to hold one or more of the sound-generating modules 110 described in detail above with reference to FIGS. 1A-2B. With reference to FIGS. 1A-2B and 4 together, one of the modules 110 can be positioned within the third portion 447 (independent of the toy 100) such that a user 450 can actuate the module 110. In the illustrated embodiment, for example, the user can blow air 454 toward the module 110 (e.g., toward the first open portion 114) to activate the air sensor 120 to cause the module 110 to generate an audio output 448. In some embodiments, the third portion 447 can include one or more openings positioned over/adjacent to the module 110 to allow the air 454 to move toward and/or against the air sensor 120.

In some embodiments, the module 110 within the third portion 447 of the casing 440 is identical or substantially identical to the module 110 within the toy 100. Accordingly, in one aspect of the present technology the casing 440 is configured to allow the user 450 to actuate the module 110 within the third portion 447 to hear an audio output corresponding to that of the toy 100, while the toy 100 is still packaged within the casing 440 such as, for example, when the toy 100 is for sale within a store. In other embodiments, the module 110 within the third portion 447 can be different than that of the module 110 within the toy 100. For example, the memory 127 of the module 110 within the third portion 447 can be programmed to store fewer audio outputs (e.g., just a single sample audio output) than that of the module 110 within the toy 100. In some embodiments, the module 110 and the casing 440 can be disposable such that after the toy 100 is removed from the casing 440 (e.g., after the user 450 purchases the toy 100), the user 450 can simply discard the casing 440 including the module 110.

In some embodiments, the casing 440 can further include an opening (not shown; e.g., the opening 346 shown in FIG. 3) configured to permit the user 450 to manually actuate the body 102 of the toy 100 to trigger the module 110 therein to generate an audio output. In additional embodiments, the casings 340 and 440 described above with reference to FIGS. 3 and 4 may be configured for use with other suitable toys (in addition to or in lieu of toy 100) and/or other suitable products/items to be sold.

Referring to FIGS. 1A-2B and 4 together, in yet other embodiments one of the airflow sensors 120 can be positioned within the third portion 447 of the casing 400 and operably coupled to the toy 100 via one or more wires (e.g., one or more leads extending from the third portion 447 to the second portion 444 of the casing 400), a wireless connection, or the like. More specifically, the airflow sensor 120 can be operably coupled to the PCB 124 and the speaker 126 of the toy 100. Accordingly, the user can blow air 454 toward the air sensor 120 in the third portion 447 of the casing 440 to activate the air sensor 120 to cause the module 110 within the toy 100 to generate one or more audio outputs. In some embodiments, the airflow sensor 120 can be disconnected from the toy 100 (e.g., automatically or by the user) after the toy 100 is removed from the casing 440, and the casing 440 can be discarded. In one aspect of the present technology, incorporating only the air sensor 120 in the casing 440—rather than another entire one of the modules 110—can reduce the overall cost of the casing 440.

The above detailed description of embodiments of the technology are not intended to be exhaustive or to limit the technology to the precise form disclosed above. Although specific embodiments of, and examples for, the technology are described above for illustrative purposes, various equivalent modifications are possible within the scope of the technology as those skilled in the relevant art will recognize. For example, although steps are presented in a given order, alternative embodiments may perform steps in a different order. The various embodiments described herein may also be combined to provide further embodiments.

From the foregoing, it will be appreciated that specific embodiments of the technology have been described herein for purposes of illustration, but well-known structures and functions have not been shown or described in detail to avoid unnecessarily obscuring the description of the embodiments of the technology. Where the context permits, singular or plural terms may also include the plural or singular term, respectively.

Moreover, unless the word "or" is expressly limited to mean only a single item exclusive from the other items in reference to a list of two or more items, then the use of "or" in such a list is to be interpreted as including (a) any single item in the list, (b) all of the items in the list, or (c) any combination of the items in the list. Additionally, the term "comprising" is used throughout to mean including at least the recited feature(s) such that any greater number of the same feature and/or additional types of other features are not precluded. It will also be appreciated that specific embodiments have been described herein for purposes of illustration, but that various modifications may be made without deviating from the technology. Further, while advantages associated with some embodiments of the technology have been described in the context of those embodiments, other embodiments may also exhibit such advantages, and not all embodiments need necessarily exhibit such advantages to fall within the scope of the technology. Accordingly, the disclosure and associated technology can encompass other embodiments not expressly shown or described herein.

I claim:

1. A sound-generating toy, comprising:
   a body defining a chamber, wherein the body is deformable to vary a volume of the chamber; and
   a sound-generating module positioned within the chamber, wherein the sound-generating module includes
   a housing,
   an airflow sensor configured to detect a pressure change in the chamber and to output a signal indicating the pressure change;
   a speaker; and
   programmable circuitry operably coupled to the airflow sensor and the speaker, wherein the programmable circuitry is configured to (a) receive the signal indicating the pressure change from the airflow sensor and (b) drive the speaker to generate an audio output after receiving the signal indicating the pressure change,
   wherein the airflow sensor, the speaker, and the programmable circuitry are each positioned within the housing.

2. The toy of claim 1 wherein the audio output is at least one of a word, a phrase, or a sentence.

3. The toy of claim 1 wherein the body is deformable in response to a user squeezing the body, and wherein deformation of the body is configured to generate the pressure change in the chamber.

4. The toy of claim 1 wherein the housing includes a first opening and a second opening, and wherein the airflow sensor is positioned adjacent to the first opening, and wherein the speaker is positioned adjacent to the second opening.

5. The toy of claim 1, further comprising a power source operably coupled to the programmable circuitry.

6. The toy of claim 1 wherein the pressure change is a first pressure change, wherein the audio output is a first audio output, wherein the airflow sensor is further configured to detect a second pressure change in the chamber and to output a signal indicating the second pressure change, and wherein:
   the programmable circuitry is further configured to (a) receive the signal indicating the second pressure change from the airflow sensor and (b) drive the speaker to generate a second audio output after receiving the signal indicating the second pressure change,
   wherein the second audio output is different than the first audio output.

7. The toy of claim 1 wherein the sound-generating module is not fixed within the chamber.

8. The toy of claim 1 wherein the body includes an inner surface defining the chamber, and wherein the sound-generating module is fixed to a portion of the inner surface.

9. The toy of claim 1 wherein the body includes an opening, and wherein the sound-generating module is removable from the chamber through the opening.

10. A sound-generating module, comprising:
    a housing having a first opening and a second opening that is separate from the first opening,
    an airflow sensor configured to detect a pressure change and to output a signal indicating the pressure change;
    a speaker; and programmable circuitry operably coupled to the airflow sensor and the speaker, wherein the programmable circuitry is configured to (a) receive the signal indicating the pressure change from the airflow sensor and (b) drive the speaker to generate an audio output after receiving the signal indicating the pressure change, and wherein the airflow sensor, the speaker, and the programmable circuitry are each positioned within the housing so that the airflow sensor is positioned adjacent to the first opening and the speaker is positioned adjacent to the second opening.

11. The sound-generating module of claim 10 wherein the audio output is one of a plurality of different audio outputs, wherein the programmable circuitry includes a memory storing instructions for outputting a plurality of drive signals to the speaker, and wherein individual ones of the drive signals are configured to drive the speaker to generate a corresponding one of the plurality of audio outputs.

12. The sound-generating module of claim 11 wherein the memory is a one-time programmable memory.

13. The sound-generating module of claim 10 wherein the audio output is at least one of a word, a phrase, or a sentence.

14. The sound-generating module of claim 10 wherein the audio output is a sound of a human bodily function.

15. A sound-generating device, comprising:
a body having a chamber, wherein the body is deformable to vary a pressure in the chamber; and
a module positioned within the chamber, wherein the module includes
a housing,
an airflow sensor configured to detect a change in the pressure in the chamber and to output a signal indicating the change in the pressure;
an electronic component coupled to the airflow sensor; and
programmable circuitry operably coupled to the airflow sensor and the electronic component, wherein the programmable circuitry is configured to (a) receive the signal indicating the change in the pressure from the airflow sensor and (b) drive the electronic component to generate an output after receiving the signal indicating the change in the pressure,
wherein the airflow sensor, the electronic component, and the programmable circuitry are each positioned within the housing.

16. The sound-generating device of claim 15 wherein the electronic component is a light source, and wherein the output is a light pattern.

17. The sound-generating device of claim 16 wherein the light pattern is visible outside of the chamber.

* * * * *